United States Patent

Ricq et al.

[11] Patent Number: 5,398,467
[45] Date of Patent: Mar. 21, 1995

[54] FIRE BARRIER AERATION DEVICE WITH STATIC ELEMENTS

[75] Inventors: Sano Ricq, Meximieux; Dominique Egea, Lyons; Jacqus Bureau, Ecully, all of France

[73] Assignees: Electricite de France Service National, Paris; Mecanique Application Tissus, Ecully, both of France

[21] Appl. No.: 62,849

[22] Filed: May 18, 1993

[51] Int. Cl.⁶ ............................................. E04B 1/94
[52] U.S. Cl. ..................................... 52/232; 52/1; 52/317; 52/573.1; 169/48
[58] Field of Search ................ 52/1, 173.1, 232, 302.7, 52/317, 573.1; 169/48, 64; 454/257, 357

[56] References Cited

U.S. PATENT DOCUMENTS

| | | | |
|---|---|---|---|
| 4,109,423 | 8/1978 | Perrain | 52/232 X |
| 4,136,707 | 1/1979 | Gaillot et al. | 52/1 X |
| 4,493,173 | 1/1985 | Kohaut | 52/232 X |
| 4,669,759 | 6/1987 | Harbeke | 52/232 X |
| 4,712,342 | 12/1987 | Legerius et al. | 52/232 X |
| 4,748,787 | 6/1988 | Harbeke | 52/232 X |
| 4,823,530 | 4/1989 | Haring | 52/317 |
| 4,882,886 | 11/1989 | Harbeke | 52/232 |
| 4,888,925 | 12/1989 | Harbeke | 52/232 |
| 5,105,592 | 4/1992 | MacMillan et al. | 52/232 |

FOREIGN PATENT DOCUMENTS

| | | |
|---|---|---|
| 7203 | 1/1980 | European Pat. Off. . |
| 63336 | 3/1983 | European Pat. Off. . |
| 2326947 | 5/1977 | France . |
| 3509729 | 10/1986 | Germany . |
| 2218719 | 11/1989 | United Kingdom ............ 52/232 |

Primary Examiner—Carl D. Friedman
Assistant Examiner—Kevin D. Wilkens
Attorney, Agent, or Firm—Sughrue, Mion, Zinn, Macpeak & Seas

[57] ABSTRACT

A fire barrier aeration device intended to ensure free exchange of air between two spaces separated by a wall which is equipped therewith and to break the passage of gas through the wall, when fire breaks out in one of the spaces, comprises at least one body (10) made of a refractory material intended to be disposed in an orifice of the wall. The body is passed through by an aeration passage (17) at the end of which, emerging on a face of the body which is turned in the direction from where the fire may come, there is disposed an element (21) made of an intumescent material which in the absence of fire leaves a portion of the cross section of the aeration passage (17) free and which is at least partially surrounded by a flexible material (22) for guiding and confining the inflation of the intumescent material (21) in the aeration passage (17) in order to make the material completely block the passage in the case of fire.

8 Claims, 3 Drawing Sheets

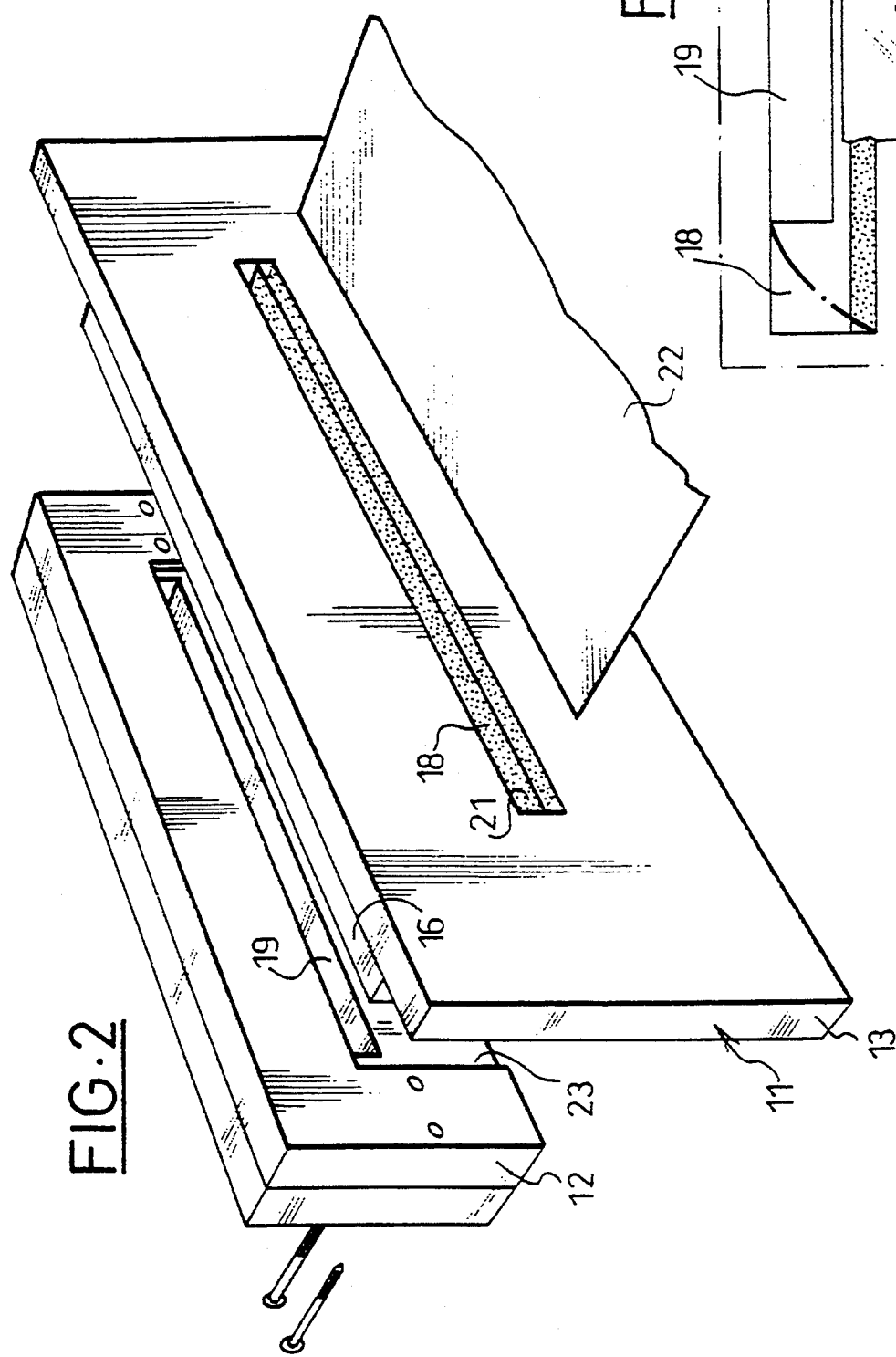

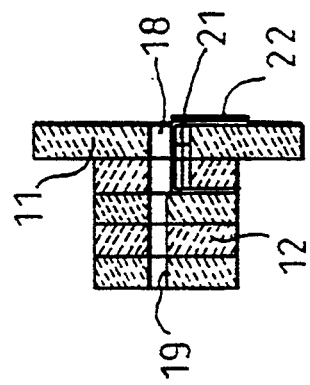
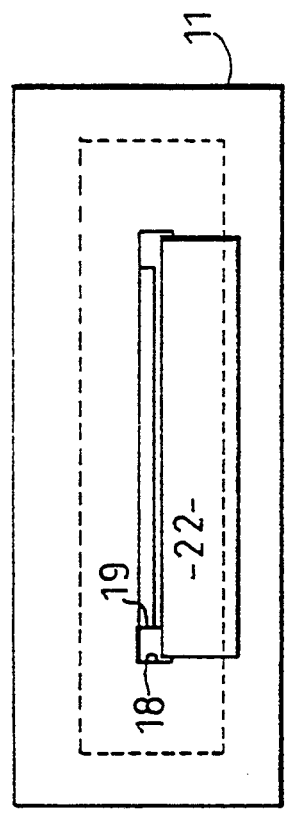
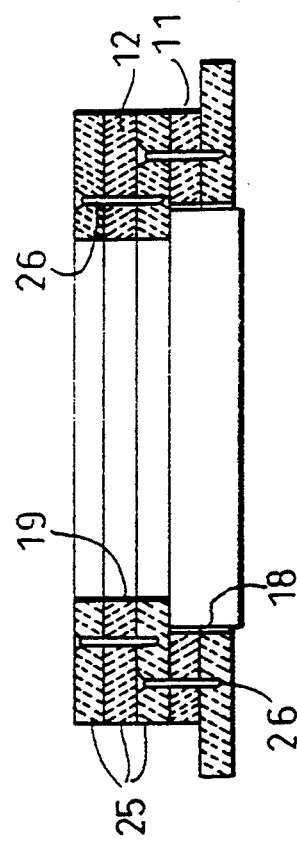

5,398,467

FIRE BARRIER AERATION DEVICE WITH STATIC ELEMENTS

BACKGROUND OF THE INVENTION

The present invention relates to protection against the propagation of fire between zones separated by a wall and between which free exchange of air must be produced in normal situations and more particularly relates to a fire barrier device which can be mounted in the separating wall of the aforementioned zones.

Fire barrier protections in particular for electrical power cables are ensured by means of fire barrier sheaths made of leaktight products.

Such cables release by the Joule effect a quantity of heat which causes heating in their bulk.

The temperature reached by a cable after stabilisation is linked to the efficiency of the fire barrier protective sheath.

It is therefore necessary to produce a fire barrier device which, while ensuring in the case of fire the required protection, that is to say a fire barrier function for a predetermined period of time, allows in normal operating conditions dissipation of the heat released by the Joule effect which is sufficient to guarantee correct behaviour of the protected cables over time.

The ventilation of electrical power cables inside their protective jacket or sheath has hitherto been ensured either by a dynamics system called a "strap-type shutter", or by a protection device provided with an opening which is not blockable in the case of outbreak of fire.

The strap-type shutter has the following drawbacks:

The complexity of its construction requires it to be produced partly in a unitary manner, to requirements, on site;

it is subject to risks of premature closure by mechanical breaking of the strap with a heat-meltable fuse when the protected cables are in use;

it is difficult to reopen after the fire;

it is difficult to fit with precision with respect to surrounding equipment because of its large bulk caused by the presence of the strap and of a cover which is to be held open under normal operating conditions.

SUMMARY OF THE INVENTION

The invention aims to overcome the drawbacks of known devices by creating a fire barrier device which while having a particularly simple construction, ensures the aeration function and the fire barrier function in a particularly effective manner.

Its subject is therefore a fire barrier aeration device intended to ensure free exchange of air between two spaces separated by a wall which is equipped therewith and to break any passage of gas through the wall, when fire breaks out in one of the spaces, characterised in that it comprises at least one body made of a refractory material intended to be disposed in an orifice of the wall, the said body being passed through by an aeration passage at the end of which, emerging on the face of the body which is turned in the direction from where the fire may come, there is disposed an element made of an intumescent material which in the absence of fire leaves a portion of the cross section of the aeration passage free and which is at least partially surrounded by a flexible material for guiding and confining the inflation of the intumescent material in the aeration passage in order to make the material completely block the said passage in the case of fire.

BRIEF DESCRIPTION OF THE DRAWING

The invention will be better understood on reading the description which is to follow and is made with reference to the attached drawings, which are given solely by way of example and in which:

FIG. 2 is an exploded perspective view of the fire barrier aeration device according to the invention;

FIG. 3 is a front view of the fire barrier aeration device according to the invention;

FIG. 3a is a partial front view on a larger scale showing a detail of FIG. 3;

FIG. 4 is a section along the line 4—4 in FIG. 3;

FIG. 5 is a section along the line 5—5 in FIG. 4; and

DETAILED DESCRIPTION OF THE PREFERRED EMBODIMENT

Figure 1:
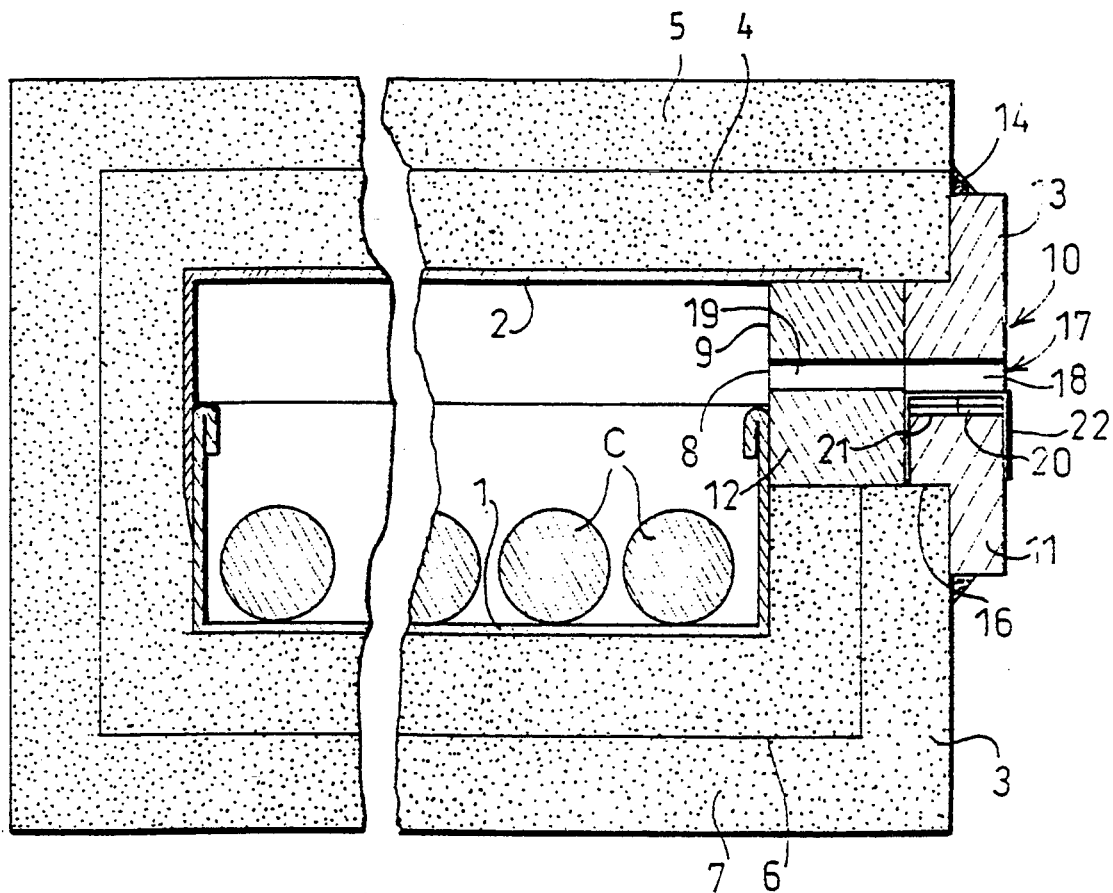
FIG. 1 is a schematic sectional view of a protective jacket of a cable path provided with a fire barrier aeration device according to the invention.

FIG. 1 represents in section a protective jacket for electrical power cables C comprising a sheet metal support 1 on the bottom of which the cables C are disposed.

The support 1 is supplemented by a sheet metal cover 2, the assembly being housed in a thermal protection sheath 3 formed in the present example from two layers 4 and 5 of ceramic wool with adhesive interposed between the layers 4 and 5 and a coating 7 of fabric of the same type disposed on the outer face of the external ceramic wool layer 5.

An orifice 8 is made in a lateral wall of the jacket thus constituted, which orifice is cut into the sheath 3 opposite a gap 9 provided between the support 1 and its cover 2.

A fire barrier aeration device 10 according to the invention is mounted in the orifice 8. This aeration device comprises a body made of a refractory material, for example based on aluminosilicate fibres.

In the present example the body 10 is formed from two elements 11, 12, a first element 11 having a free face turned towards the outside of the sheath 3 and a second element 12 having a free face turned towards the inside of this sheath.

The first element 11 is provided with a peripheral collar 13 by means of which it is applied against the outer wall of the sheath 3 and fixed to the latter for example by adhesive bonding at 14 and with a core portion 16 engaged and adhesively bonded in the orifice 8 made in the sheath.

The second element 12 has a constant cross section and is engaged in its entirety in the orifice 8.

The bodies 11, 12 of the aeration device are passed through by an aeration passage 17 comprising a part 18 with a larger cross sectional area made in the first element 11 and a second part 19 of smaller cross sectional area made in the second element 12.

The upper walls of the two parts 18, 19 of the passage 17 are aligned whereas their two lower walls define a recess 20 in which are placed elements made of an intumescent material 21 which rest on the lower wall of the part 18 of the passage made in the first element 11 of the body and whose height in the noninflated state is approximately equal to the height of the recess 20.

Thus, in normal aeration operation the useful cross section of the passage 17 is approximately equal to that of the part 19 made in the second element 12 of the body.

There is disposed on these elements 21 made of an intumescent material, a flexible element 22, for example made of glass fabric coated with silicone, one end of which is folded over the free face of the first element 11 and fixed to the latter by adhesive bonding, and the other end of which is engaged between the opposing faces of the first and second elements 11 and 12 of the body in a manner which will be described in particular with reference to FIG. 2.

The fabric element 22 acts as an expansion guide for the intumescent product and furthermore ensures its mechanical protection.

With reference now to FIG. 2, in which the aeration device is represented in exploded perspective, it is seen that the face of the second element 12 of the body situated facing the first element 11 comprises an impression 23 intended freely to receive the end of the guiding element 22 opposite its end adhesively bonded to the free face of the first element 11.

It is furthermore seen that the first and second parts 18 and 19 of the passage 17 which are made in the elements 11 and 12 of the body are produced in the form of elongate slots. The part 19 made in the second element 12 of the body emerges in the impression 23 for the guiding cloth 22.

A particular embodiment of the device according to the invention has been represented in FIGS. 3 to 5.

In FIG. 3, it is seen that the fabric 22 forming an expansion guide for the intumescent product extends over the whole length of the slot 18 made in the first element 11 of the body.

It is also seen that the length of this slot 18 is greater than that of the slot 19 made in the second element 12 for a reason which will be explained with reference to FIG. 3a.

In FIG. 4, it is seen that the body of the fire barrier device is produced by assembling plates 25 made of a refractory material, for example of the type based on aluminosilicate fibres, assembled by screws 26.

In the present example, the first element 11 comprises two plates 25 while the second element 12 comprises three plates.

According to one variant, the assembly of the plates 25 together may be produced by adhesive bonding.

The section represented in FIG. 5 clearly shows the difference in height of the slots 18 and 19 produced in the first and second elements 11, 12 respectively as well as the location occupied by the intumescent material 21 formed by four juxtaposed bars whose height is approximately equal to the difference in height of the first and second parts 18, 19 of the passage 17.

The fabric 22 sheaths the bars of intumescent material 21 on three sides.

FIG. 3a shows the manner in which the intumescent material expands under the effect of heat.

The volume which it occupies in the inflated state is represented by a dot and dash line.

It is seen that, at its ends, the inflated intumescent material has a curved shape which does not occupy the whole of the end of the slot 18 of the first element 11 of the body.

Conversely, because the slot 19 of the second element 12 is shorter than the slot 18, the intumescent material achieves maximum inflation in the region of the end of the slot 19 and completely plugs the passage 17 in the region of this slot.

Figure 6:
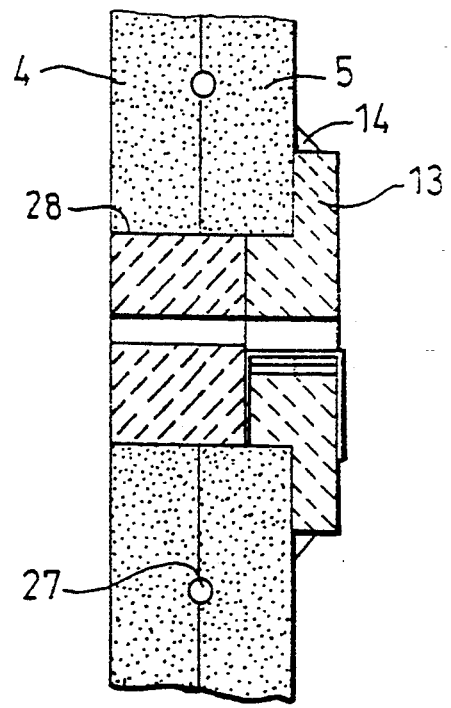
FIG. 6 is a schematic section representing a mode of mounting the aeration device in the wall of a box element made of reinforced ceramic wool.

A mode of mounting a fire barrier device according to the invention has been represented in FIG. 6 in a wall formed by two layers 4, 5 of ceramic wool covering a lattice structure 27.

The fire barrier device is mounted in an orifice intended to receive it, with interposition of a layer of adhesive 28.

The part of the device forming the collar 13 is fixed to the corresponding face of the layer 5 made of ceramic wool by a bead of adhesive 14 as already represented in FIG. 1.

The device which has just been described is intended to ensure protection against fire on one face of a wall.

It is however possible to produce a fire barrier protection on two opposite faces. For this purpose, it is sufficient to place in an orifice of the wall two devices of the type described hereinabove having an element made of an intumescent material placed in proximity to each face of the wall, the aeration passage passing through the wall being defined by the two aforementioned devices, possibly supplemented by connection elements made of a refractory material, whose number and thickness are a function of the thickness of the wall.

In the various examples which have just been described, the aeration passage has a rectilinear slot shape. It is however possible to envisage giving this passage any other shape and to adapt thereto the shape of the intumescent material.

The various tests performed in particular on fire barrier aeration devices mounted in protective jackets of cable paths have revealed perfect blocking of the aeration passages in the presence of an increase in temperature corresponding to a fire outbreak situation, and did so in a reproducible manner.

We claim:

1. A fire barrier aeration device intended to ensure free exchange of air between two spaces separated by a wall which is equipped therewith and to break the passage of gas through the wall, when fire breaks out in one of the spaces, the aeration device comprising: at least one body (10) made of a refractory material intended to be disposed in an orifice of the wall, the body being passed through by an aeration passage (17) at the end of which, emerging on a face of the body which is turned in a direction from where a fire may come, there is disposed an element (21) made of an intumescent material which in the absence of fire leaves a portion of the cross section of the aeration passage (17) free and which is at least partially surrounded by a flexible material (22) for guiding and confining the inflation of the intumescent material (21) in the aeration passage (17) in order to make the material completely block the passage in the case of fire.

2. A fire barrier device according to claim 1, wherein the aeration passage (17) comprises a first part (18) emerging on the face of the body (10) which is turned in the direction from where the fire may come and a second pan (19) having a cross sectional area less than that of the first part (18) and emerging on the opposite face of the body (10), said first part and second part of said aeration passage having a difference in height, the intumescent material being disposed in the first part (18) of the passage over a height equal to the difference in height of the first and second parts (18, 19) of the aeration passage (17).

3. A device according to claim 2, wherein the body (10) is made of at least two elements (11, 12), the first and second parts (18, 19) of the aeration passage (17) being disposed in the first and second elements (11, 12), respectively.

4. A device according to claim 3, wherein the body (10) is made by assembling plates (25) made of a refractory material joined by screws or adhesive.

5. A device according to claim 3, wherein the flexible material (22) for guiding and confining the inflation of the intumescent material (21) comprises an element made of glass fabric coated with silicone, one end of which is folded over the free face of the first element (11) and fixed to the latter by adhesive bonding and the other end of which is engaged between the opposing faces of the first and second elements (11, 12) of the body (10) in an impression (23) made in one of the first and second elements (11, 12).

6. A device according to claim 5, wherein the first and second parts (18, 19) of the aeration passage (17) comprise elongate slots, the slot (18) made in the first element (11) of the body having a length greater than that of the slot (19) made in the second embodiment (12) of the body, and the intumescent material (21) housed in the first part (18) of the passage has the same length as the latter and ensures when it is inflated, by virtue of its length being greater than that of the slot (19) of the second element (12), a complete blocking of the slot of the second element.

7. A fire barrier aeration device intended to produce a protection against fire on two opposing faces of a wall, comprising two devices according to any one of claims 1 to 6, disposed in a passage passing through the wall and each comprising an element made of an intumescent material disposed at the end of the aeration passage emerging on the corresponding face of the wall, the aeration passage passing through the wall being defined by the two devices.

8. A fire barrier aeration device according to claim 7, wherein said two devices are supplemented by connection elements made of a refractory material whose number and thickness are a function of the thickness of the wall.

* * * * *